United States Patent [19]

Hall

[11] Patent Number: 5,327,875
[45] Date of Patent: Jul. 12, 1994

[54] VAPOR ENHANCED CARBURETION SYSTEM

[76] Inventor: S. Franklin Hall, 3585 Jefferson Rd., Ashtabula, Ohio 44004

[21] Appl. No.: 19,916

[22] Filed: Feb. 19, 1993

[51] Int. Cl.$^5$ ............................................. F02M 31/00
[52] U.S. Cl. ....................................... 123/545; 123/557
[58] Field of Search .............. 123/557, 543, 547, 545, 123/552, 25 L, 25 R, 25 A, 25 B, 25 D, 25 J; 261/145, DIG. 83

[56] References Cited

U.S. PATENT DOCUMENTS

| | | | |
|---|---|---|---|
| 3,872,191 | 3/1975 | Walcker | 261/145 |
| 4,023,538 | 5/1977 | Harpman et al. | 123/3 |
| 4,050,419 | 9/1977 | Harpman et al. | 123/3 |
| 4,167,165 | 9/1979 | Finlay et al. | 261/145 |
| 4,223,652 | 9/1980 | Budnicki | 123/557 |
| 4,366,797 | 1/1983 | Jackson et al. | 123/523 |
| 4,368,712 | 1/1983 | Jackson et al. | 123/523 |
| 4,397,286 | 8/1983 | Jackson et al. | 123/523 |
| 4,461,245 | 7/1984 | Vinokur | 123/25 L |
| 4,469,075 | 9/1984 | Jackson et al. | 123/523 |
| 4,567,857 | 2/1986 | Houseman et al. | 123/557 |
| 4,679,539 | 7/1987 | Storbakken | 123/557 |
| 4,703,741 | 11/1987 | Curran et al. | 123/557 |
| 4,784,092 | 11/1988 | Pitti | 123/557 |
| 4,836,173 | 6/1989 | Stires | 123/557 |
| 4,883,616 | 11/1989 | Covey | 261/145 |
| 4,909,192 | 3/1990 | Forster et al. | 123/557 |
| 4,984,555 | 1/1991 | Huang | 123/557 |

Primary Examiner—Tony M. Argenbright
Assistant Examiner—M. Macy
Attorney, Agent, or Firm—Oldham, Oldham & Wilson Co.

[57] ABSTRACT

A carburetion system for an internal combustion engine includes fuel vaporizing gun which operates as a heat exchanger with heat from the engine exhaust manifold. The system may be manually or automatically operative when hot exhaust gases from the engine heat the gun to sufficient temperatures for vaporizing the fuel. A vapor fuel shut-off valve positioned on the vapor line to the engine intake ports regulates the air to gas mixture to a ratio of between 15 and 16 to 1, for maximum combustion, increased fuel mileage and reduced emissions.

36 Claims, 3 Drawing Sheets

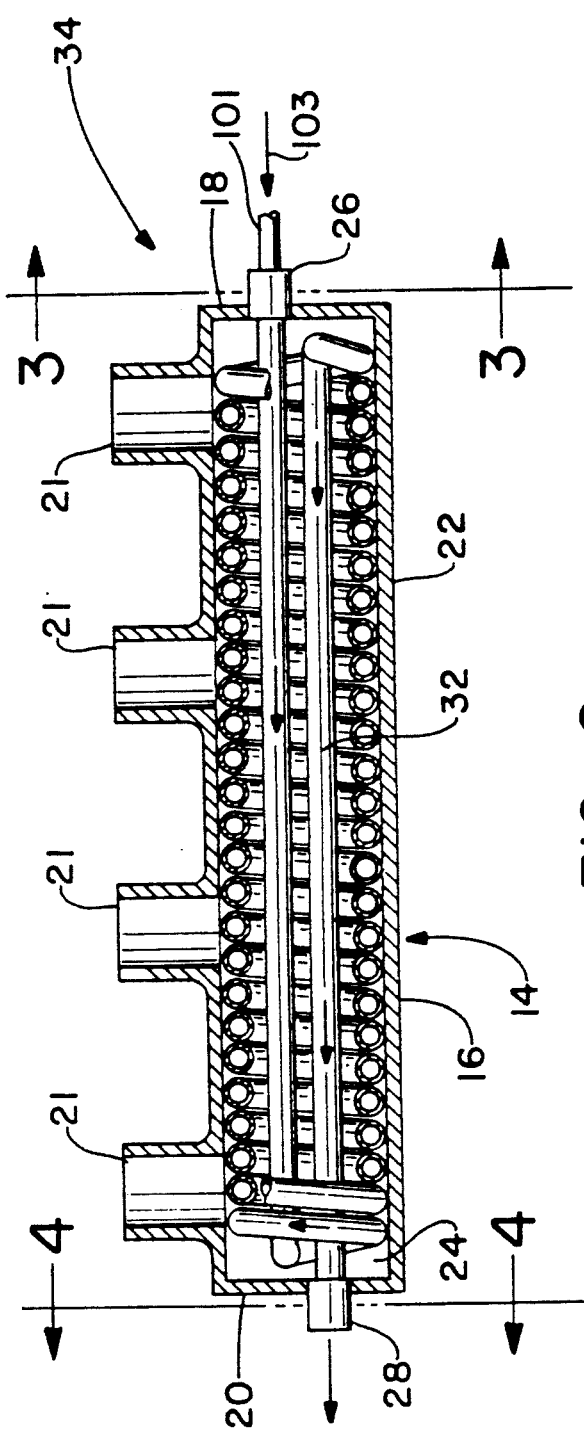
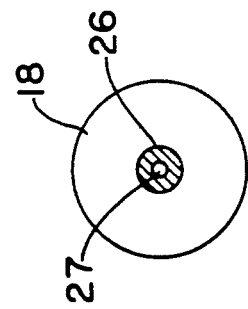
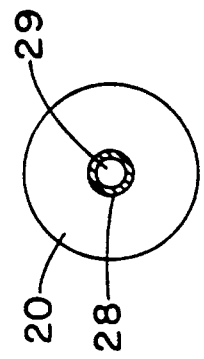
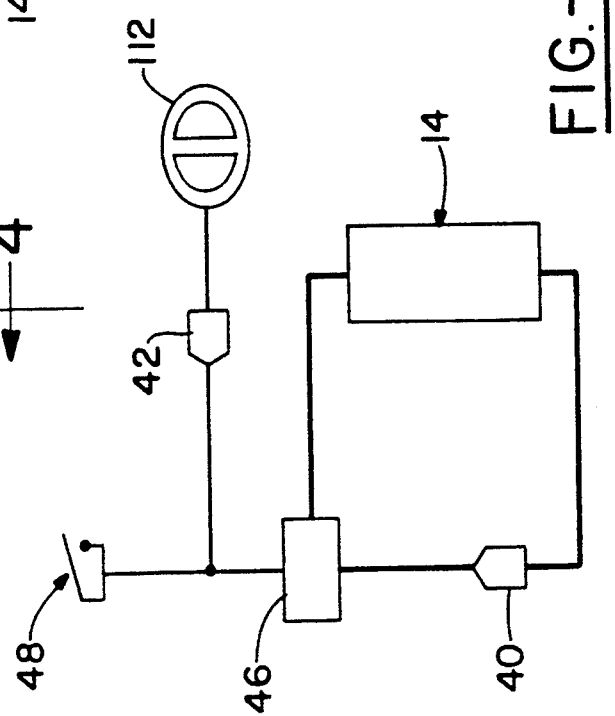
FIG.-2
FIG.-3
FIG.-4
FIG.-5

VAPOR ENHANCED CARBURETION SYSTEM

FIELD OF THE INVENTION

The present invention relates to a carburetion system which produces vapor fuel for an internal combustion engine. More particularly, liquid fuel is vaporized in a vaporizing gun by heat exchange using hot engine-exhaust gases and the vapor fuel is pulled directly to the engine intake ports. Sufficient vapor fuel is produced for engine requirements at all speeds with resultant increased fuel economy and substantially decreased hydrocarbon emissions from a lean and clean combustion.

BACKGROUND OF THE INVENTION

Various fuel systems directed to increased efficiency for internal combustion engines exist in the prior art. For example, U.S. Pat. No. 3,872,191, to Walcker, includes a fuel processing unit with a helical wound heat exchange tubing and surrounding fine wire mesh screen. Liquid fuel flows downward by gravity over the hot wire mesh screen heated by the coiled tubing to vaporize the fuel. The vapor fuel is mixed with air and sent to the engine intake manifold. Since the fuel is gravity fed with resultant limited vapor conversion, Walcker may be impractical.

U.S. Pat. No. 4,023,538 to Harpman, describes a device which simultaneously vaporizes gasoline and water in a multi-chambered heated pressure vessel with built in regulators for controlling pressure and volume. This device also lacks control of vapor production with resultant limited vapor production, such that operation is limited to speeds near 35 m.p.h.

The hot fuel gas generator disclosed in U.S. Pat. No. 4,050,419, also to Harpman, simultaneously vaporizes gasoline and water, and includes a metering valve for adding air to the gaseous fuel. Vapor conversion from this device is limited, because the vaporizing means is an electronic resistance heating element. This device may also be impractical due to uncontrolled mixing of air and fuel vapor and inefficient delivery of the vapor fuel through a passageway of a tube and a metering valve.

U.S. Pat. No. 4,366,797, to Jackson and Arndt, includes a fuming tank for providing a fumed fuel-air mixture to the carburetor. The fumed fuel is prepared by passing a vortex of air through a diffusing member and across the surface of the liquid fuel.

U.S. Pat. No. 4,368,712, also to Jackson and Arndt, discloses an electronic monitoring and control system to monitor combustion of the vaporized fuel and air mixture, for increased responsiveness to the engine's demand for fuel.

U.S. Pat. No. 4,397,286, also to Jackson and Arndt, further discloses a vaporous gasoline aspiration system and fuming tank, wherein some vanes of the dispersing members are curved in opposite directions.

U.S. Pat. No. 4,469,075 to Jackson, Arndt and Maynard, provides electronic means co-acting with the engine and fuel system, including monitoring of the manifold vacuum, oxygen content of exhaust gases, engine coolant temperatures, engine throttle signal, output fuel signal and output air signal, for responsiveness to the engine's operative load and for controlling the fuel to air intake ratio.

However, none of the above prior art teaches the efficient, direct heating of liquid fuel by surrounding the vapor line with hot gases from the engine exhaust manifold, and employing those extremely hot gases as a means for vaporizing the fuel. The vaporizing mechanisms of the prior art do not produce vapor fuel rapidly enough to accommodate the widely divergent fuel requirements of state-of-the-art engines. Generally, the volume of vapor fuel created in prior art devices is insufficient; the means for mixing air and vapor fuel is uncontrolled; and the means for delivery of the vapor fuel to the engine is inefficient.

SUMMARY OF THE INVENTION

Accordingly, a primary object of the invention is forming a heat exchanger for thermal transfer of hot exhaust gases for vaporizing the liquid fuel to a vapor fuel.

A further object of the invention is to provide a fuel vaporizing gun with a vapor tube containing liquid fuel within a vaporizer chamber of the gun to form a heat exchanger, such that hot gases from the engine directed into the chamber surround the vapor tube with resultant thermal exchange and production of vapor fuel from liquid fuel within the tube.

Another object of the invention is to provide a means for controlling pressure in the vapor tube, for ensuring sufficient liquid fuel injection to the vaporizing gun and production of vapor fuel for engine requirements at all speeds and modes of operation of the engine.

A still further object of the invention is to provide a means for regulating fuel injection into the vapor tube and a means for preventing backflow in the vapor tube for safety.

A still further object of the invention is incorporating in the vapor fuel carburetion system a means for switching from liquid fuel to production of vapor fuel.

Yet another object of the invention is the provision of a means for controlling water injection to increase pressure in each cylinder of the engine.

A still further object of the invention is to provide a means for mixing which communicates with the engine carburetor and a fuel vapor valve to maintain the air to fuel mixture ratio in a range between 15 to 1 and 16 to 1 for maximum vapor fuel combustion.

These and other objects and advantages of the invention will be apparent upon reference to the following description taken in conjunction with the accompanying drawings, which illustrate preferred embodiments thereof.

BRIEF DESCRIPTION OF PREFERRED EMBODIMENT

The fuel system of this invention uses a liquid fuel such as gasoline or other ignitable fuels which are now typically used in an internal combustion engine and provides a means for producing a vapor fuel using heat from the engine exhaust gases to form the vapor by thermal transfer in a heat exchanger.

In one preferred embodiment of the invention, a fuel vaporizing gun incorporates a closed vaporizer chamber with an enclosed vaporizer cavity. A vapor tube containing liquid fuel is positioned in the fuel line and traverses the vaporizer cavity while the cavity receives hot gases by its interconnection with exhaust ports of the engine. The vaporizer chamber with vapor tube therein act as a heat exchanger for thermal transfer, wherein hot exhaust gases surrounding the vapor tube vaporize liquid fuel in the tube.

The vapor tube of this carburetion system bypasses the carburetor and the vapor fuel contained therein is completely enclosed until drawn into the engine intake ports. A means for switching from a liquid fuel to production of vapor fuel depends upon temperature in the vaporizer chamber. The system further provides for controlled water injection through the carburetor for increasing engine compression. A fuel enhancing mixer precisely controls the air to fuel ratio directed to each intake port of the engine.

BRIEF DESCRIPTION OF THE SEVERAL VIEWS OF THE DRAWINGS

FIG. 2 is a cross-sectional view through the vaporizing gun forming a primary element of the invention with various elements thereof partially broken away for the purpose of illustration;

FIG. 3 is an elevation view, in cross-section, taken on line 3—3 of FIG. 2, illustrating an fuel spray orifice into the vaporizer chamber of the carburetion system;

FIG. 4 is an elevation view in cross-section, taken on line 4—4 of FIG. 2, illustrating an output orifice from the vaporizer chamber shown in FIG. 2.

FIG. 5 is a schematic diagram of the electrical means for switching from liquid fuel to creation of vapor fuel, such means shown here as a manual toggle switch.

DETAILED DESCRIPTION AND BEST MODE

Figure 1:
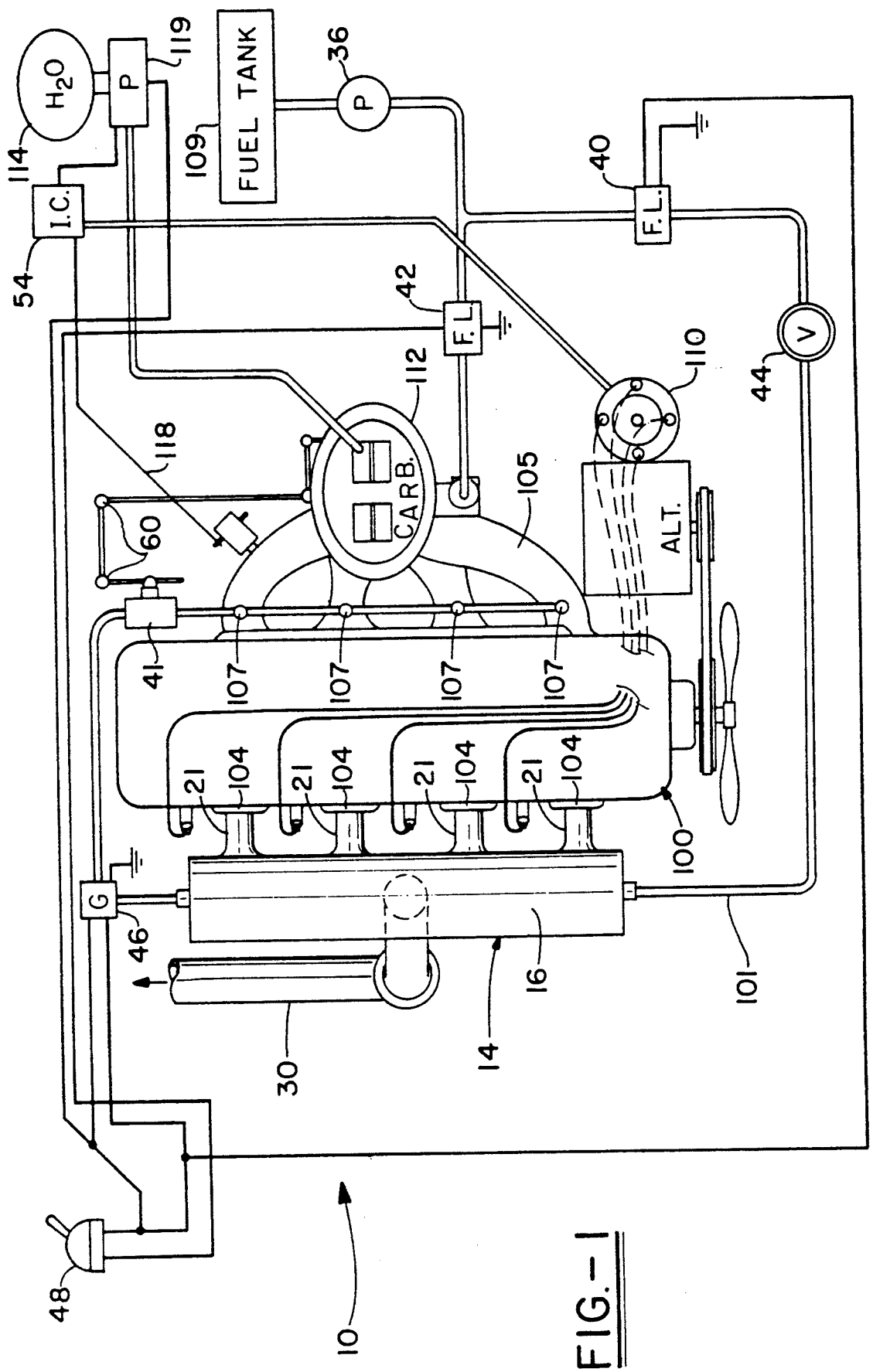
FIG. 1 is a top view of a conventional four cylinder liquid fuel powered engine illustrating both pictorially and schematically the apparatus of the present invention.

Referring now in particular to FIG. 1, the vapor carburetion system 10 of the present invention is shown operatively conjoined to an internal combustion engine 100. The vaporizing gun 14 of the system 10 with its closed vaporizer chamber 16 is depicted by the cross-sectional view of FIG. 2.

The vaporizer gun 14 is a sufficiently important element of the invention to be disclosed and discussed at the outset. The gun 14 has a first end 18 and a second end 20 and a body portion 22 therebetween to form a vaporizer cavity 24. Referring to FIG. 3, a fuel spray valve 26 in the first end 18 of the vaporizer chamber 16 provides a tiny opening or orifice 27 for entry of liquid fuel 103 from a portion of the fuel line 101. Likewise the output or outlet valve 28, (shown in FIG. 4), in the second end 20 of the vaporizer gun 14 similarly has an output opening or orifice 29 of very small diameter which is, however, somewhat larger than the fuel spray orifice 27.

Intake ports 21 are positioned along the body portion 22 between the two ends of the vaporizer chamber 16, whereby hot exhaust gases (not shown) from the engine 100 enter the vaporizer chamber 16. An exhaust port 30 is also connected along the chamber body for eliminating gases from the gun 14.

The closed vaporizer chamber 16 and the body portion 22 thereof enclose a vaporizer cavity 24. A vapor tube 32 passes through the vaporizer cavity 24, interconnects the fuel spray orifice 27 and outlet orifice 29, and is adapted to receive measured quantities of liquid fuel 103 through the fuel spray orifice 27. The vaporizer chamber 16 and the vapor tube 32 together form a heat exchanger 34 for vaporizing liquid fuel 103 in the vapor tube 32.

The vapor tube 32, which is the tube-side of the heat exchanger 34, can be wound, shaped, or otherwise formed to various configurations to enhance or maximize thermal transfer as the tube and its liquid fuel passes through the vaporizer cavity 24. However, as is shown in FIG. 2, the vapor tube 32 is preferably formed to extend from the fuel spray orifice 27 at the first end 18 to the second end 20 of the vaporizer chamber 16, whereupon the vapor tube 32 is wound upon itself and formed into helical coil, and thus coiled upon itself back toward the first end again. At the end of the helical coiled portion, the tube 32 reverses again and extends back toward the outlet orifice 29 at the second end 20 of the vaporizer chamber 16.

It will be understood by those skilled in the art, that the vapor tube 32 passing through the vaporizer cavity 24, with its content of liquid fuel, together with the enclosed vaporizer chamber 16 essentially form a shell-and-tube-type heat exchanger. The rate of heat transfer, q, for such heat exchangers is expressed most conveniently in terms of the equation, $q = U\ A\ \Delta T$, wherein the heat transfer coefficient, U, in most types of exchangers is a strong function of temperature difference, $\Delta T$. The area, A, used in reporting exchanger sizes or heat-transfer coefficients is the surface through which heat transfer takes place.

Therefore, increasing the surface area of the vapor tube 32 within the vaporizer cavity 24 by forming or winding the tube on itself, in the form of a helical coil, increases the surface through which heat transfer takes place, thereby increasing the rate of heat transfer. I have found that every microscopic portion of the vapor tube 32 encounters heat from the exhaust gases in the vaporizer cavity 24. Coiling the vapor tube 32 provides maximum exposure to the heat.

In this embodiment of the invention shown in FIG. 2, the hot exhaust gases flow across, or transverse to, the general direction of flow of fuel in the tube, thereby forming a cross-flow heat exchanger to maximize thermal transfer.

Following vaporization, the vapor fuel of this system is entirely confined within the vapor tube while pulled to the intake ports in response to reduced pressure at the cylinder head. Only at that point is the vapor fuel combined with air by action of a mixer, thereby ensuring safety by vapor fuel confinement and combining the vapor fuel with air at the engine wall.

Very generally, the most common heat exchangers comprise shell-and-tube-type exchangers for performing the function of heating a fluid within the tube by surrounding the tube with a hot fluid within the shell, so that very little transferred heat is lost. In tube-side construction, the standard heat-exchanger tubing is ¼th, ⅜, ½, ⅝, ¾, 1-¼ and 1-½ inches outside diameter. Common practice is to specify exchanger surface in terms of total external square feet of tubing.

In shell-side construction, heat-exchanger shells are generally made of standard wall steel pipe in various sizes up to 12 inches diameter; from ⅜-inch-wall pipe in sizes from 14 to 24 inches; and from steel plate rolled at discrete intervals in larger sizes. Tube layouts within the shell are generally symmetrical about both horizontal and vertical axes. The distance from the tubing outside diameter to center line of the pass partition is 5/16- inch for a shell with inside diameter less than 22 inches and ⅜-inch for larger shells.

The shell-side arrangement for the vaporizing gun 14 is generally a one-pass shell. However, by use of a longitudinal baffle to form a two-pass shell, improved thermal efficiency may be attained. Additionally, segmental baffles or cross-flow baffles may be used. The vaporizing gun may further comprise a two-pass shell, or split flow shell, wherein the longitudinal baffle may be solid or perforated; a double-split flow, wherein a plurality of longitudinal baffles are solid or perforated or such other shell-side arrangements which are well-known in the art for thermal transfer. However, the one-pass shell has been found preferable for use in this carburetion system.

Maximum shell-side heat transfer rates are generally obtained by means of a cross-flow exchanger, wherein the shell-side fluid is at essentially right angles to the tubes. Counterflow or parallel flow exchangers could be used in this application, but will be recognized by those skilled in the art as having little potential for increasing thermal transfer. However, variously well-known heat exchangers connected serially or otherwise may be considered for more effective thermal transfer and vaporization of liquid fuel in this application. Thus in another embodiment, the vaporizer gun 14 may comprise two or more shells in series for further improved thermal transfer and increased production of vapor fuel.

For maximum performance of the vaporizer gun 14, the exhaust ports 104 of the engine are integrally connected with the intake ports 21 of the vaporizer chamber 16.

Hot exhaust gases from the engine are preferably directed across the vapor tube 32 at an essentially right angle whereby the vaporizer chamber 16 and vapor tube 32 essentially form a cross-flow heat exchanger. Alternatively, hot exhaust gases may flow through the vaporizer chamber 16 in a direction opposite to the flow of fluid within the vapor tube 32, whereby the chamber and tube would essentially form a counterflow heat exchanger. The vaporizer chamber 16 and vapor tube 32 would form a parallel flow heat exchanger if the shell or vaporizer chamber 16, and tube within, the vapor tube 32, are arranged so that fluid in the vaporizer chamber 16 flows essentially parallel to fluid in the vapor tube 32.

The vapor tube 32 is preferably coiled for added length within the vaporizer chamber 16 to enhance vaporization of liquid fuel 103 within the vapor tube. In order to maximize creation of vapor in the tube, the vapor tube 32 is in a range between 15 to 30 feet in length, preferably 15 to 25 feet, more preferably 16 to 20 feet. The outside diameter of the vapor tube preferably ranges from ¼ to ½ inch, more preferably 5/16 to 7/16-inch; with the inside diameter of the vapor tube ranging from ⅛th to ⅜th inch, more preferably from 3/16th to 5/16 inch.

Referring now to FIG. 5, the means for controlling pressure in the vapor tube 32 may be a pressure gauge 46, which communicates electrically with a first fuel lock 40 and simultaneously with the vapor tube 32 as the vapor tube exits the vaporizing gun 14. As such, the means for controlling essentially regulates pressure in the vapor tube in a range between 1 to 5 psig, more preferably 2 to 4 psig. In this way, the carburetion system produces only that vapor fuel required by the engine for instant use. The system fulfills the engine's need for vapor fuel when the engine needs it.

The means for controlling pressure in the vapor tube 32 is adapted for transmitting first and second signals to the first fuel lock 40 dependent on pressure in the vapor tube 32. The first signal to the first fuel lock for release of fuel 103 indicates release of fuel to the vapor tube 32 when pressure in the vapor tube is below the minimum limit of the pressure range, or below 2 psig. The means for controlling pressure communicates a second signal to the first fuel lock 40 to shut off when pressure in the vapor tube 32 is above the maximum limit of the pressure range, or above 4 psig.

The means for controlling pressure in the vapor tube 32 may be an electrical pressure gauge 46, a thermocouple pressure gauge, or more preferably, an oil pressure switch. Such gauges or switch may further communicate with a microprocessor (not shown) for monitoring and controlling pressure in the vapor tube 32 within defined limits.

Figure 6:
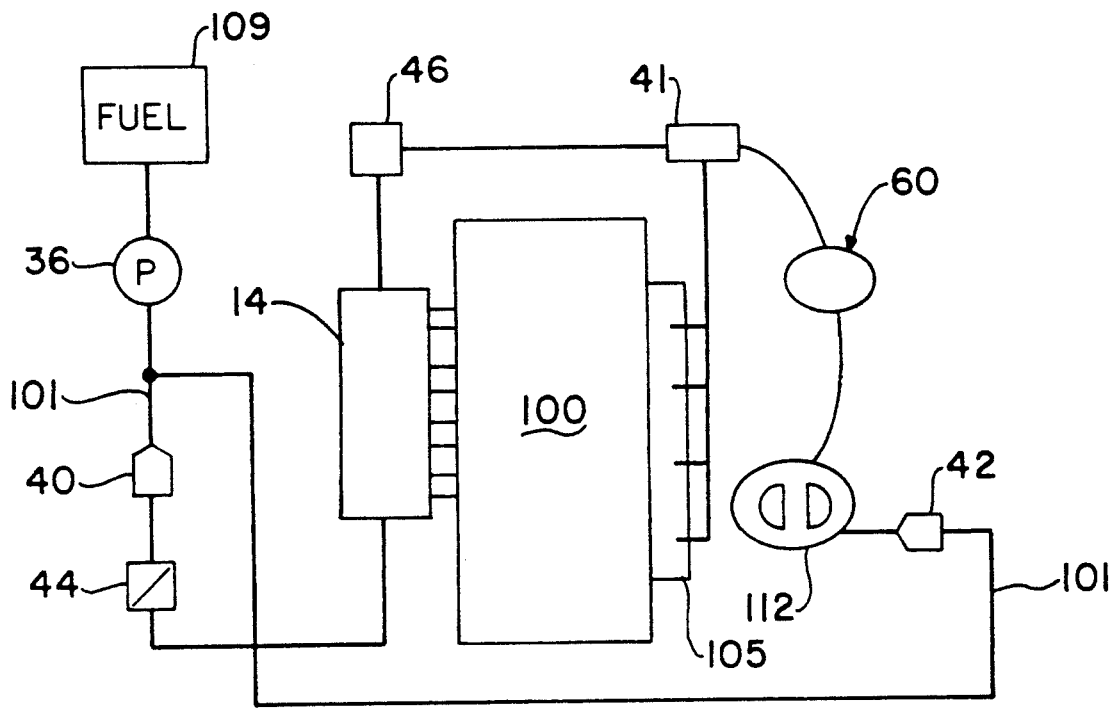
FIG. 6 is a schematic diagram indicating positioning of the pressure controller in the vapor line and means for mixing to obtain a 16 to 1 air to fuel ratio.

As shown in FIGS. 1 and 6, a fuel pump 36, a first fuel lock 40, and a check valve 44, are positioned in the fuel line 101 in series following the means for controlling pressure, in advance of the gun 14, such that the first fuel lock is electrically connected to the pressure controlling means, shown in this embodiment as pressure gauge 46. Check valve 44 is a one-way valve which prevents backflow of liquid or vapor fuel for safety.

Diameters for the liquid fuel input or fuel spray orifice 27 and for the output or outlet orifice 29 may be varied according to length of the vaporizer chamber, dimensions of the vaporizer cavity and length of the vapor tube. However, the fuel spray orifice 27 in the first end 18 of the vaporizer chamber 16 is preferably in a range between 61/1000ths to 65/1000 inch, more preferably 62/1000ths inch, for a vaporizer gun about 20 inches in length.

The diameter of the output or outlet orifice 29 of a vaporizer chamber 16 is preferably in a range between 90/1000th to 95/1000th inch, more preferably 94/1000 inch, for a vaporizer gun about 20 inches in length.

Referring to FIG. 1, the vaporizer gun 14 is a primary element in a carburetion system 10 for an internal combustion engine 100 having among other major components, an intake manifold 105 with intake ports 107, cylinders, (not shown) a plurality of exhaust ports 104 for eliminating hot exhaust gases from the engine, a liquid fuel source or tank 109, a fuel line 101 with a first fuel lock 40, a second fuel lock 42, and check valve 44 in said line, a distributor 110 and a carburetor 112.

The carburetion system 10 includes a means for switching from liquid fuel to production of vapor fuel with the vaporizer gun 14 when an internal temperature in the vaporizer gun is in a range between 300° F. and 600° F.

It will be understood that heat at the compression head of an internal combustion engine 100 in operation will approximate 250° F. to 1550° F., whereupon the hot exhaust gases from the engine entering the cavity 24 of the vaporizer chamber 16 in the vaporizing gun 14, will have temperatures approximating 550° to 1250° F. Those exhaust gas temperatures are sufficient for vaporizing the liquid fuel 103 in the vapor tube 32.

The means for switching may be a manual toggle switch 48 which communicates with the means for controlling pressure, pressure gauge 46, to simultaneously close the second fuel lock 42 and open the first fuel lock 40, thereby allowing a liquid fuel into the vaporizer gun 14 for creation of vapor fuel in the vapor tube 32. The means for switching from a liquid fuel to production of vapor fuel may, more preferably be an electrical switch device. Further, a thermocouple which communicates with the means for controlling pressure to simultaneously close the second fuel lock and open the first fuel lock would also serve as a means for automatic switching to eliminate a manual switch 48. Other automatic means for switching from liquid fuel combustion to production of vapor fuel will be known to those skilled in the art.

Figure 7:
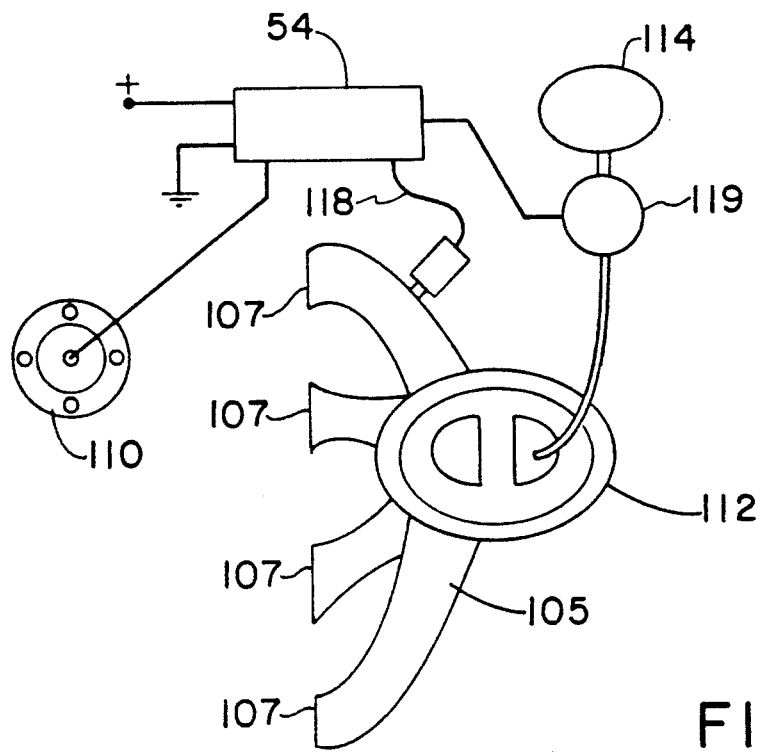
FIG. 7 is a schematic diagram of the water injection controller in communication with the distributor, engine intake manifold, and water pump.

The vapor carburetion system 10 of the present invention further incorporates a means for controlling water injection to increase pressure in each cylinder of the engine 100. Referring to FIG. 7, there is shown a water injection controller 54 which communicates with the engine intake manifold, 105, the distributor 110, and a water pump 119, for varying water injection dependent upon a vacuum in the intake manifold 105 and upon engine RPMs indicated by the distributor 110. The means for controlling water injection, or water controller 54, is connected by a vacuum line 118 to the engine intake manifold 105 and electrically connected to the distributor 110. The water injection controller 54 further comprises a water source or tank 114, the water pump 119 and carburetor 112 connected in series to the intake manifold 105 of the engine.

The water is drawn into the intake ports 107 and vaporizes in each engine cylinder (not shown), with consequent 1,000 to 1 expansion for increased engine compression.

An "EDELBROCK TM" water controller may be used for a water injection controller 54. More preferably, a "VERA-JECTION TM" water controller is adaptable for use as the means for controlling water injection in the carburetion system of the subject invention.

It may be seen by referring again to FIG. 6, that the vapor enhanced carburetion system further incorporates a means for mixing, indicated as a mechanical linkage 60, which articulates with the carburetor 112 and the vapor fuel valve 41 for enhancing the air to fuel mixture entering each intake port 107 of the engine 100 to an air to fuel ratio in a range between 15 to 1 and 16 to 1 for maximum vapor fuel combustion.

The means for mixing to optimize the air to fuel ratio may be a mechanical linkage 60 which articulates with a carburetor lever (not shown) and the vapor fuel valve 41 for regulating that ratio, as shown, or alternatively, the means for mixing may be an electrical controller for regulating the air to fuel ratio. More preferably, the means for mixing is an electro-mechanical controller for regulating the air to fuel mixture. Still more preferably, the means for mixing is the microprocessor or other computerized or automatic form of control which communicates with the carburetor 112 and the vapor fuel valve 41 to achieve the optimum 15-1 air to vapor fuel ratio.

When in use in conjunction with an internal combustion engine, liquid fuel is directed to a vaporizer gun 14 the cavity 24 of which is heated by extremely hot exhaust gases received from the engine exhaust ports 104. More specifically, the engine exhaust ports 104 are interconnected with intake ports 21 of the vaporizer chamber 16.

The engine may be switched manually, or by an automatic switch means, to production of vapor fuel when temperatures in the gun reach 300° F. to 600° F. A first fuel lock 40 is signalled to open, and simultaneously, the second fuel lock 42 for supply of liquid fuel to the engine is closed.

Upon production of vapor fuel by the vaporizer gun 14, the means for controlling pressure monitors pressure in the vapor tube 32 and regulates that pressure in a range between 1 to 5 psig. Vapor fuel is drawn directly to intake ports of the engine 107, bypassing the carburetor 112, where vapor fuel is mixed with air at the cylinder head by mixer 60 to achieve a 15 to 1 fuel to air ratio.

A water controller 54, while monitoring engine RPMs and the vacuum of the engine intake manifold 105, supplies water through the carburetor 112 to each intake port 107 for increasing engine compression. As such, fuel consumption is drastically reduced by use of the vapor fuel system; and concomitantly, the engine burn is more complete with resultant reduction in hydrocarbon emissions.

The terms and expressions set forth herein are used as terms of description and not of limitation, and there is not intention in the use of such terms and expressions to exclude any equivalents of any of the features shown or described, or portions thereof, and it is recognized that various modifications are possible. The invention should not be limited by such terms and expressions. The invention disclosed should, however, be limited only by the scope of the following claims.

I claim:

1. A fuel vaporizing gun for an internal combustion engine, the engine having among other components, exhaust ports for eliminating hot exhaust gases from the engine, a liquid fuel, a fuel line with a fuel lock in said line, and intake ports, said gun positioned near the engine, comprising:

a vapor tube positioned in the fuel line;

a closed vaporizer chamber formed around the tube; said vaporizer chamber connected to exhaust ports of the engine to collect hot exhaust gases and vaporize liquid fuel in the tube by thermal transfer from hot exhaust gases surrounding the tube; and a means for controlling pressure in the vapor tube, said means for controlling pressure positioned in the fuel line, communicating with said vapor tube, and adapted for regulating liquid fuel injection into the vapor tube;

said means for controlling pressure including means for monitoring pressure in said vapor tube and for maintaining pressure in said vapor tube in a predetermined range in response thereto.

2. The fuel vaporizing gun of claim 1, further comprising said closed vaporizer chamber having first and second end, a body portion therebetween forming a vaporizer cavity, a fuel spray orifice in the first end, an outlet orifice in said second end, and intake ports and an exhaust port positioned along the body;

said vapor tube passing through the vaporizer cavity of said chamber to interconnect said fuel spray orifice to the outlet orifice; said tube surrounded by hot exhaust gases which flow across the tube from the exhaust ports of the engine; said chamber and tube essentially forming a cross-flow heat exchanger for vaporizing liquid fuel in said tube.

3. The vaporizing gun of claim 1, wherein exhaust gases in the vaporizer chamber flow counter to flow of liquid fuel in the vapor tube; said chamber and tube essentially forming a counter flow heat exchanger.

4. The vaporizing gun of claim 1, wherein exhaust gases in the vaporizer chamber flow parallel to flow of liquid fuel in the vapor tube; said chamber and tube essentially forming a parallel flow heat exchanger.

5. The vaporizing gun described in claim 1, wherein the vapor tube is coiled for added length and increased production of vapor fuel.

6. The vaporizing gun described in claim 5, wherein said vapor tube is in a range between 15 to 30 feet in length.

7. The vaporizing gun described in claim 6, wherein the outside diameter of said vapor tube is in a range from ¼ to ½ inch.

8. The vaporizing gun described in claim 7, wherein the inside diameter of said vapor tube is in a range from ⅛ to ⅜ inch.

9. The vaporizing gun described in claim 2, wherein the means for controlling pressure in the vapor tube is a pressure gauge; said pressure gauge adapted to maintain pressure in the tube in a range between 1 to 5 psig.

10. The vaporizing gun described in claim 1, wherein the means for controlling pressure in the vapor tube is an electrical pressure gauge; said electrical pressure gauge adapted to maintain pressure in the tube in a range between 1 to 5 psig.

11. The vaporizing gun described in claim 1, wherein the means for controlling pressure in the vapor tube is a pressure gauge in communication with a microprocessor for maintaining pressure in the tube in a range between 1 to 5 psig.

12. The vaporizing gun of claim 11, wherein said means for controlling pressure is adapted for transmitting first and second signals to the fuel lock dependent on pressure in the vapor tube; said means for controlling pressure transmits the first signal to the fuel lock for release of fuel to the vapor tube when pressure in the vapor tube is below the minimum limit of the pressure range; and said means for controlling pressure signals the second signal to the fuel lock to shut off when pressure in the vapor tube is above the maximum limit of the pressure range.

13. The vaporizing gun of claim 12, wherein said fuel spray orifice and the outlet orifice each have a respective diameter.

14. The vaporizing gun described in claim 13, wherein the diameter of the fuel spray orifice is in a range between 60/1000ths to 65/1000ths inch.

15. The vaporizing gun described in claim 14, wherein the diameter of the outlet orifice of the chamber is in a range between 90/1000ths to 95/1000ths inch.

16. A carburetion system for an internal combustion engine, the engine having an intake manifold with intake valves, cylinders, a plurality of exhaust ports for eliminating hot exhaust gases from the engine, a liquid fuel source, a fuel line with a fuel pump, first and second fuel locks in said line, a distributor and a carburetor, comprising:

a vaporizing gun, said gun comprising a closed vaporizer chamber having first and second ends, a body portion therebetween forming a vaporizer cavity, and positioned on the fuel line, adjacent the engine, a fuel spray orifice at the first end, an outlet opening at the second end of the vaporizer chamber, a plurality of intake ports and an exhaust port positioned along the body of the gun; said fuel spray orifice and the outlet opening each having a respective diameter; a vapor tube within the vaporizer chamber interconnecting said fuel spray orifice to the outlet orifice; a means for controlling pressure positioned in the fuel line and communicating with the vapor tube; a fuel pump, the first fuel lock, and a check valve positioned in the fuel line in series following said means for controlling pressure, in advance of the gun, said first fuel lock electrically connected to said means for controlling pressure; said first fuel lock adapted for regulating fuel injection into the vapor tube at said fuel spray orifice when opened by the means for controlling pressure; and, means for heating fuel in the vapor line within said chamber to vaporize the fuel; said plurality of intake ports of the gun integrally connected to the exhaust ports of the engine; and the means for heating fuel in the vapor tube is the hot exhaust gases which enter the vaporizer chamber from the exhaust manifold of the engine and surround the vapor line to vaporize the liquid fuel while the liquid fuel traverses through the vaporizing gun;

a means for switching from a liquid fuel to production of vapor fuel by said vaporizer gun when an internal temperature in the vaporizer gun is in a range between 300° and 600° F.

17. The carburetion system of claim 16, wherein the means for switching is a manual toggle switch which communicates with the means for controlling pressure to simultaneously close said second fuel lock and open said first fuel lock.

18. The carburetion system of claim 16, wherein the means for switching is an electrical switch device which communicates with the means for controlling pressure to simultaneously close said second fuel lock and open the first fuel lock.

19. The carburetion system of claim 16, wherein the means for switching is a thermocouple which communicates with the means for controlling pressure to simultaneously close said second fuel lock and open the first fuel lock.

20. The carburetion system of claim 16, further comprising a means for controlling water injection to increase pressure in each cylinder of the engine.

21. The carburetion system of claim 20, wherein the means for controlling water injection communicates with the engine intake manifold, the distributor, and the water pump, said controller adapted for varying water injection dependent upon a vacuum in the intake manifold and upon engine RPM's.

22. The carburetion system of claim 21, wherein said means for controlling water injection is connected by a vacuum line to the engine intake manifold, electrically connected to the distributor and to the water pump.

23. The carburetion system of claim 22, wherein the means for controlling water injection further comprises a water source, water pump and carburetor connected in series to the intake manifold of the engine, where the water vaporizes with consequent 1,000 to 1 expansion for increased engine compression.

24. The carburetion system of claim 23, wherein the means for controlling water injection is a VERA-JECTION ™ water controller.

25. The carburetion system of claim 23, wherein the means for controlling water injection is an EDELBROCK ™ water controller.

26. The carburetion system of claim 16, further comprising a means for mixing communicating between the carburetor and the fuel vapor valve, said means for mixing adapted for enhancing an air to fuel mixture entering each intake port of the engine to an air to fuel ratio in a range between 15 to 1 and 16 to 1 for maximum vapor fuel combustion.

27. The carburetion system of claim 26, wherein the means for mixing is a mechanical linkage which articulates with a carburetor lever and the vapor valve for regulating the air to fuel ratio.

28. The carburetion system of claim 26, wherein the means for mixing is an electrical controller for regulating the air to fuel ratio.

29. The carburetion system of claim 26, wherein the means for mixing is electro-mechanical controller for regulating the air to fuel ratio.

30. A process for producing vapor fuel for use in an internal combustion engine having a fuel line for a liquid fuel which is combined with air prior to combustion at the cylinder head; an intake manifold having reduced pressure and intake ports for entry of fuel to the cylinder head, and exhaust ports for hot exhaust gases with measurable temperatures; said engine further having measurable rpms when in operation, cylinders adapted for compression of a fuel prior to combustion, and a water source, comprising the steps of:
 a. positioning an enclosed tube in the fuel line;
 b. passing liquid fuel through the tube;
 c. vaporizing the liquid fuel by surrounding the tube with hot exhaust gases from the engine;
 d. monitoring and controlling pressure in the tube so as to maintain the pressure in said tube within a predetermined range by regulating liquid fuel injection into the tube; and
 e. drawing the vapor fuel directly to the engine intake ports as required by the reduced pressure at the ports.

31. The process of claim 30, wherein pressure in the tube is controlled in a range between 1 to 5 psig.

32. The process of claim 31, further comprising, after step e), the step of:
 f) mixing air and the vapor fuel to provide an air to fuel mixture ratio in a range between 15 to 1 and 16 to 1.

33. The process of claim 32, further comprising, after step f), the steps of:
 g) monitoring engine RPMs;
 h) monitoring pressure in the intake manifold;
 i) providing a volume of water through the carburetor to the intake manifold for increased compression at each cylinder head, said volume of water being dependent upon engine RPMs and the pressure in the intake manifold.

34. The process of claim 33, further comprising, after step i), the steps of:
 j) monitoring the temperature of exhaust gases surrounding the tube;
 k) switching from liquid fuel to vapor fuel when engine exhaust gases surrounding the tube exceed a predetermined temperature.

35. A process for producing vapor fuel for use in an internal combustion engine having a fuel line for a liquid fuel which is combined with air prior to combustion at the cylinder head; an intake manifold having reduced pressure and intake ports for entry of fuel to the cylinder head, and exhaust ports for hot exhaust gases with measurable temperatures; said engine further having measurable RPMs when in operation, cylinders adapted for compression of a fuel prior to combustion, and a water source, comprising the steps of:
 a. positioning an enclosed vapor tube in the fuel line;
 b. directing liquid fuel to the vapor tube;
 c. monitoring and controlling pressure in the vapor tube so as to maintain the pressure in said vapor tube within a predetermined range by regulating liquid fuel into the vapor tube;
 d. forming a closed vaporizer chamber around the vapor tube;
 e. directing hot exhaust gases into the chamber to surround the tube to produce vapor fuel from the liquid fuel by thermal transfer from the gases to liquid fuel in the tube;
 f. drawing the vapor fuel directly to intake ports of each cylinder as required by reduced pressure at the cylinder head;
 g. mixing air and the vapor fuel to provide an air to fuel mixture ratio in a range between 15 to 1 and 16 to 1;
 h. providing a volume of water through the carburetor to the intake manifold for increased compression at each cylinder head, said volume of water dependent upon engine rpms and the pressure in the intake manifold; and
 i. switching from liquid fuel to vapor fuel when engine exhaust gases surrounding the tube exceed a predetermined temperature.

36. A carburation system for an internal combustion engine, the engine having an intake manifold with intake valves, cylinders, a plurality of exhaust ports for eliminating hot exhaust gases from the engine, a liquid fuel source, a fuel line with a fuel pump, first and second fuel locks in said line, and a distributor, comprising:
 a vaporizing gun, said gun comprising a closed vaporizer chamber having first and second ends, a body portion therebetween forming a vaporizer cavity, and positioned in the fuel line adjacent the engine, a fuel spray orifice at the first end, an outlet opening at the second end of the vaporizer chamber, a plurality of intake ports and an exhaust port positioned along the body of the gun; a vapor tube within the vaporizer chamber interconnecting said fuel spray orifice to the outlet opening; a means for controlling pressure positioned in the fuel line and communicating with the vapor tube; a fuel pump, the first fuel lock, and a check valve positioned in the fuel line in advance of the gun, said first fuel lock electrically connected to said means for controlling pressure; said first fuel lock adapted for regulating fuel injection into the vapor tube at said fuel spray orifice when opened by the means for controlling pressure; and, means for heating fuel in the vapor line within said chamber to vaporize the fuel; said plurality of intake ports of the gun integrally connected to the exhaust ports of the engine; and the means for heating fuel in the vapor tube is the hot exhaust gases which enter the vaporizer chamber from the exhaust manifold of the engine and surround the vapor line to vaporize the liquid fuel while the liquid fuel traverses through the vaporizing gun;
 a means for switching from a liquid fuel to production of vapor fuel by said vaporizer gun when an internal temperature in the vaporizer gun is in a predetermined range.

* * * * *